United States Patent
Xu

(10) Patent No.: US 11,962,418 B2
(45) Date of Patent: Apr. 16, 2024

(54) METHOD FOR CONTROLLING DATA RETRANSMISSION AND USER EQUIPMENT

(71) Applicant: GUANGDONG OPPO MOBILE TELECOMMUNICATIONS CORP., LTD., Guangdong (CN)

(72) Inventor: Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 479 days.

(21) Appl. No.: 17/179,236

(22) Filed: Feb. 18, 2021

(65) Prior Publication Data

US 2021/0176015 A1 Jun. 10, 2021

Related U.S. Application Data

(63) Continuation of application No. PCT/CN2019/102302, filed on Aug. 23, 2019.

(60) Provisional application No. 62/722,163, filed on Aug. 23, 2018.

(51) Int. Cl.
*H04L 12/28* (2006.01)
*H04L 1/1812* (2023.01)
*H04L 1/1867* (2023.01)
*H04L 5/00* (2006.01)

(52) U.S. Cl.
CPC .......... *H04L 1/1819* (2013.01); *H04L 1/1874* (2013.01); *H04L 1/188* (2013.01); *H04L 1/189* (2013.01); *H04L 5/0055* (2013.01)

(58) Field of Classification Search
CPC ..... H04L 1/1874; H04L 1/188; H04L 5/0055; H04L 1/189
USPC .................. 370/329, 400, 403, 395
See application file for complete search history.

(56) References Cited

U.S. PATENT DOCUMENTS

| | | | |
|---|---|---|---|
| 8,930,785 B2 | 1/2015 | Sung et al. | |
| 11,129,141 B2* | 9/2021 | Kim ...................... | H04W 72/12 |
| 2007/0300120 A1 | 12/2007 | Kim et al. | |
| 2012/0039263 A1 | 2/2012 | Moberg et al. | |
| 2012/0300722 A1 | 11/2012 | Kim et al. | |
| 2016/0157218 A1* | 6/2016 | Nam .................... | H04B 7/0632 |
| | | | 370/329 |

FOREIGN PATENT DOCUMENTS

| | | |
|---|---|---|
| CN | 101068137 A | 11/2007 |
| CN | 101702812 A | 5/2010 |

(Continued)

OTHER PUBLICATIONS

Huawei et al. "HARQ timing relationships for grant-free transmission" R1-167206; 3GPP TSG RAN WG1 Meeting #86; Gothenburg, Sweden; Aug. 22-26, 2016. 2 pages.

(Continued)

*Primary Examiner* — Dang T Ton
(74) *Attorney, Agent, or Firm* — PERKINS COIE LLP

(57) ABSTRACT

A method for controlling data retransmission is provided. Data is transmitted to network device and a timer is started. The data is retransmitted after the timer expires if a HARQ-ACK feedback corresponding to the data is not received before the timer expires. Or the data is retransmitted if a HARQ-NACK feedback corresponding to the data is received from the network device before the timer expires.

10 Claims, 6 Drawing Sheets

(56) References Cited

FOREIGN PATENT DOCUMENTS

| CN | 106550439 | A | 3/2017 |
|---|---|---|---|
| CN | 108347307 | A | 7/2018 |
| CN | 110034892 | A | 7/2019 |
| JP | 2008545330 | A | 12/2008 |
| JP | 2009231950 | A | 10/2009 |
| JP | 2010502096 | A | 1/2010 |
| JP | 2011223127 | A | 11/2011 |

OTHER PUBLICATIONS

Huawei et al. "The retransmission and HARQ schemes for grant-free" R1-1608859; 3GPP TSG RAN WG1 Meeting #86bis; Lisbon, Portugal; Oct. 10-14, 2016. 5 pages.
First Office Action for Chinese Application No. 202110343366.9 dated Jul. 21, 2022. 16 pages with English translation.
Second Office Action for Chinese Application No. 202110343366.9 dated Sep. 29, 2022. 14 pages with English translation.
Extended European Search Report for European Application No. 19851918.3 dated Aug. 25, 2021. 7 pages.
Intel Corporation "Remaining issues on HARQ aspects on AUL" R2-1802892; 3GPP TSG-RAN WG2 Meeting #101; Feb. 26-Mar. 2, 2018. 5 pages.
Nokia et al. "On Configured Grant enhancements for NR URLLC" R1-1808570; 3GPP TSG RAN WG1 Meeting #94; Aug. 20-24, 2018. 6 pages.
Qualcomm "On reliable transmission of URLLC data" 3GPP TSG-RAN WG2 Meeting RAN 2 #99bis; Oct. 9-13, 2017; 5 pages.
Ericsson "Configured UL grant for NR-U" R1-1809207; 3GPP TSG-RAN WG1 Meeting #94; Gothenburg, Sweden; Aug. 20-24, 2018. 4 pages.
Examination Report for European Application No. 19851918.3 dated Apr. 29, 2022. 4 pages.
Lenovo "Discussion on retransmission design for grant-free based UL transmission" R1-1609400; 3GPP TSG RAN WG1 Meeting #86bis; Lisbon, Portugal; Oct. 10-14, 2016. 3 pages.
Notice of Reasons for Refusal for Japanese Application No. 2021-509842 dated Apr. 19, 2022. 8 pages with English translation.
Qualcomm "On reliable transmission of URLLC data" R2-1709125; 3GPP TSG-RAN WG2 Meeting RAN2 #99bis; Prague, Czech; Oct. 9-13, 2017. 5 pages.
International Search Report dated Nov. 25, 2019 of PCT/CN2019/102302 (2 pages).
Reconsideration Report by Examiner before Appeal of the JP application No. 2021-509842, dated May 15, 2023. 7 pages with English translation.
Examination Report for Indian Application No. 202127008582 dated Jan. 27, 2022. 6 pages with English translation.
Decision of Rejection for Chinese Application No. 202110343366.9 dated Nov. 23, 2022. 13 pages with English translation.
Decision of Rejection for Japanese Application No. 2021-509842 dated Nov. 18, 2022. 9 pages with English translation.
Notice of reexamination for Chinese application No. 202110343366.9 issued on Dec. 7, 2023, 11 pages with English translation.
Decision on Reexamination of the Chinese application No. 202110343366.9, issued on Feb. 9, 2024. 18 pages with English translation.

* cited by examiner

METHOD FOR CONTROLLING DATA RETRANSMISSION AND USER EQUIPMENT

CROSS-REFERENCE TO RELATED APPLICATIONS

The present application is a continuation application of International Application No. PCT/CN2019/102302, filed on Aug. 23, 2019, which claims priority to U.S. provisional application No. 62/722,163, filed on Aug. 23, 2018. The present application claims priorities and benefits of the above-identified applications and the above-identified applications are incorporated by reference herein in their entireties.

TECHNICAL FIELD

This disclosure relates to wireless communication, and more particularly to a method for controlling data retransmission and user equipment for performing the method.

BACKGROUND

In long term evolution (LTE) system, hybrid automatic repeat request (HARD) technique is utilized to ensure reliability of data transmission, specifically, reliability of data receiving. Data transmitted can correspond to transmit blocks (TB) in the physical layer, and a cyclic redundancy check (CRC) can be set in TB for verifying whether the TB is received successfully. At a receiver, which can be user equipment (UE) for downlink data transmission or a gNB (next generation node B) or other network side devices for uplink data transmission, when the data is received, it will try to decode the data, and will send back, according to CRC verification, a HARQ-ACK indicating successful data decoding or HARQ-NACK indicating failed data decoding.

In addition to HARQ-ACK and HARQ-NACK, LTE also introduce discontinuous transmission (DTX) for indicting that the receiver (the UE, for example) does not detect any downlink data transmission at a specified location, possible causes may be that a corresponding subframe is not scheduled to the UE or missed detection occurs at the UE.

In new radio (NR) Rel-16, explicit HARQ-ACK is considered to improve uplink transmission reliability because explicit HARQ-ACK could distinguish DTX from NACK. However, currently there is no concrete scheme for explicit HARQ-ACK.

SUMMARY

Features and details of the forging aspects and respective implementations thereof can be combined or substituted with each other without conflicts.

According to a first aspect of the disclosure, there is provided a method for controlling data retransmission, which includes the following. Data is transmitted to network device and a timer is started. The data is retransmitted after the timer expires, if a HARQ-ACK feedback corresponding to the data is not received before the timer expires, or the data is retransmitted if a HARQ-ACK feedback corresponding to the data is received from the network device before the timer expires.

In one implementation of the first aspect, a HARQ buffer is flushed if the HARQ-ACK feedback corresponding to the data is received from the network device before the timer expires.

In one implementation of the first aspect, the data is retransmitted by: starting another timer when the timer expires; and retransmitting the data according to a grant for retransmission, which is received from the network device before the other timer expires.

In one implementation of the first aspect, a HARQ buffer is flushed if no grant for retransmission is received from the network device before the other timer expires.

In one implementation of the first aspect, the data is retransmitted by: obtaining a time resource for retransmission according to the timer; obtaining a frequency resource for retransmission according to previous transmission; and retransmitting the data with the time resource and the frequency resource.

In one implementation of the first aspect, a location of the time resource is determined by: T+N, wherein T is the time when the timer expires, and N is a predetermined parameter.

In one implementation of the first aspect, a location of the frequency resource is determined by: RB+offset, wherein RB is a location of a frequency resource for transmitting the data before the retransmission, and offset is a predetermined parameter.

In one implementation of the first aspect, offset=0.

In one implementation of the first aspect, the HARQ-NACK feedback contains information for indicating retransmission resource, and the data is retransmitted at the retransmission resource indicated by the information.

In one implementation of the first aspect, a HARQ buffer is flushed if the number of data retransmission reaches a threshold.

In one implementation of the first aspect, the threshold is defined in specification or configured by higher layer.

According to a second aspect, a user equipment is provided. The user equipment includes a processor and a memory. The memory is coupled with the processor and configured to store program codes which, when executed by the processor, are operable with the processor to perform the method of implementations of the first aspect.

According to a third aspect, a non-transitory computer readable storage medium is provided. The non-transitory computer readable storage medium is configured to store programs which, when executed by a computer, are operable with the computer to perform the method of implementations of the first aspect.

According to a fourth aspect, a user equipment is provided. The user equipment includes a control unit, a receiving unit, and a transmitting unit. The control unit is configured to control starting of a timer. The receiving unit is configured to receive a HARQ-ACK feedback or a HARQ-NACK feedback from a network device. The transmitting unit is configured to transmit data to the network device. The transmitting unit is further configured to retransmit the data if a HARQ-ACK feedback corresponding to the data is not received before the timer expires. Alternatively, the transmitting unit is configured to retransmit the data if a HARQ-NACK feedback corresponding to the data is received from the network device before the timer expires.

In one implementation of the fourth aspect, the control unit is further configured to: flush a HARQ buffer if the receiving unit receives the HARQ-ACK feedback corresponding to the data from the network device before the timer expires.

In one implementation of the fourth aspect, the control unit is further configured to control starting of another timer when the timer expires; the receiving unit is further configured to receive a grant for retransmission from the network device before the other timer expires; the transmitting unit is further configured to retransmit the data according to the grant for retransmission.

In one implementation of the fourth aspect, the control unit is further configured to flush a HARQ buffer if the receiving unit receives no grant for retransmission from the network device before the other timer expires.

In one implementation of the fourth aspect, the transmitting unit is configured to: obtain a time resource for retransmission according to the timer; obtain a frequency resource for retransmission according to previous transmission; retransmit the data with the time resource and the frequency resource.

In one implementation of the fourth aspect, a location of the time resource is determined by: T+N, wherein T is the time when the timer expires, and N is a predetermined parameter.

In one implementation of the fourth aspect, a location of the frequency resource is determined by: RB+offset, wherein RB is a location of a frequency resource for transmitting the data before the retransmission, and offset is a predetermined parameter.

In one implementation of the fourth aspect, offset=0.

In one implementation of the fourth aspect, the HARQ-NACK feedback contains information for indicating retransmission resource, and the transmitting unit is configured to: retransmit the data at the retransmission resource indicated by the information.

In one implementation of the fourth aspect, the control unit is further configured to flush a HARQ buffer if the number of data retransmission reaches a threshold.

In one implementation of the fourth aspect, the threshold is defined in specification or configured by higher layer.

Technical schemes of the foregoing aspects and implementations thereof can be combined or substituted with each other without conflicts.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. The same reference numerals are used throughout the drawings to reference like components or features.

DETAILED DESCRIPTION

For illustrative purpose, specific exemplary implementations will now be explained in detail below in conjunction with the figures.

The implementations set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Before describing the disclosure, relevant terminology and system environment involved herein will be introduced first.

Figure 1:
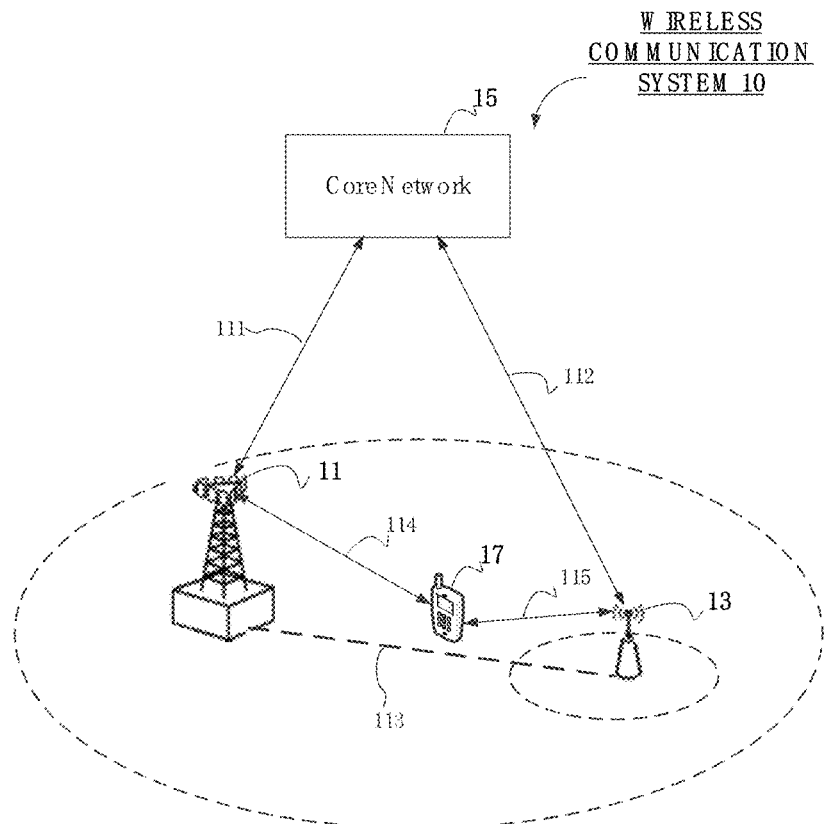
FIG. 1 is a schematic diagram illustrating a system environment involved herein.

FIG. 1 is illustrates a system architecture of a wireless communication system involved in this disclosure. The wireless communication system can work in the high frequency band and can be a LTE system, 5G system, NR system, M2M (Machine to Machine) system, and the like. As illustrated in FIG. 1, the wireless communication system 10 may include a master node (MN) 11, a secondary node (SN) 13, a core network 15, and one or more terminal device 17. The terminal device 17 establishes connection with the MN 11 the SN 13 respectively.

The MN 11 and the SN 13 are network device. For example, the MN 11 or the SN 13 can be a base transceiver station (BTS) in a time division synchronous code division multiple access(TD-SCDMA) system, an eNB in a LTE system, a gNB in a NR system. From another perspective, the MN 11 or the SN 13 can be an access point (AP), a central unit, or other network entities, and may include all or part of the functions of the above network entities. The MN 11 communicates with the terminal device 17 via a wireless interface 114 and similarly, the SN 13 communicates with the terminal device 17 via a wireless interface 115, the interfaces 114 and 115 can be Uu interfaces. The MN 11 and the SN 13 are coupled to the core network through back-hual interfaces 112 and 113 respectively.

The terminal device 17 can be distributed over the entire wireless communication system 10, and can be stable or mobile. The terminal device 17 can be implemented as a mobile device, a mobile station, a mobile unit, a M2M terminal, a wireless unit, a remote unit, an user gent, a mobile client, and other user equipment.

Communication between the terminal device 17 such as UE and the network device 11 or 13 such as a gNB is done through physical channels established there between. For example, the UE can transmit uplink data through physical uplink shared channel (PUSCH) to the Gnb and receive data and signaling such as HARQ signaling from the gNB through physical downlink control channel (PDCCH).

"Data" transmitted can be comprehended as "transport block (TB)" or "code block group (CBG)" or any other kind of data.

HARQ buffer: in each HARQ process, the receiver needs to have a separate buffer to store data received, so as to combine such data with subsequent data received to obtain combined data packet for decoding.

Figure 2:
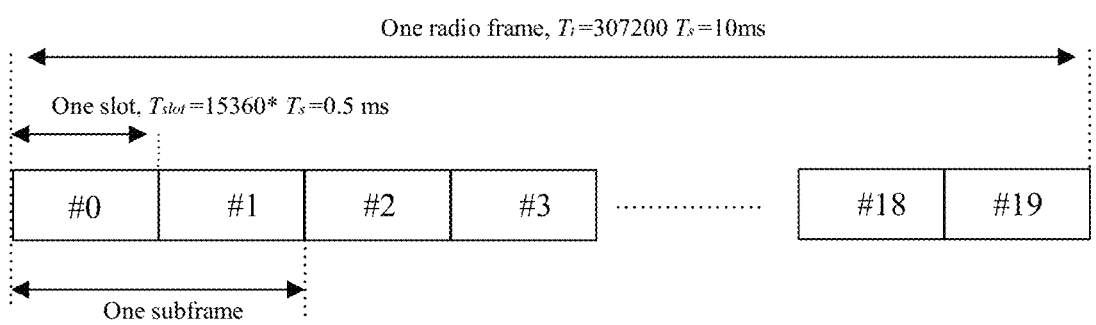
FIG. 2 is a schematic diagram illustrating an example frame structure.
Figure 3:
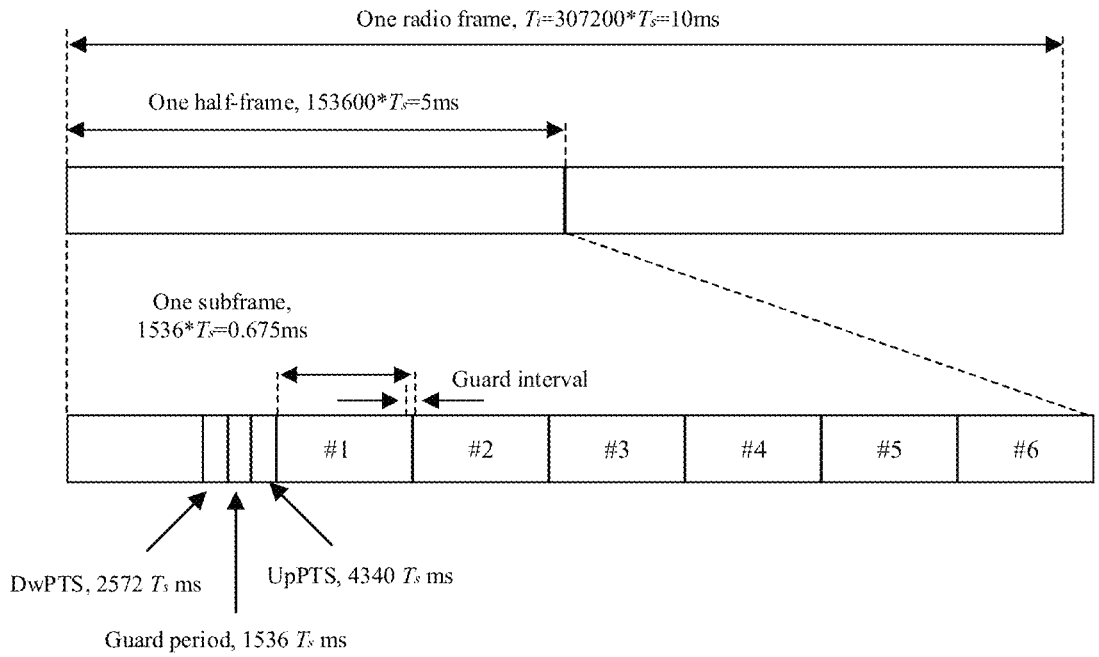
FIG. 3 is a schematic diagram illustrating an example frame structure.

Frame structure: as illustrated in FIG. 2, in frequency division duplexing (FDD) mode, a system frame is 10 ms in length and is composed of 10 subframes with each subframe of 1 ms. One subframe is composed of two continuous slots, each of which is 0.5 ms. For TDD, uplink transmission and downlink transmission are distinguished by frequency domain and in each 10 ms, there are 10 subframes for uplink transmission and 10 subframes for downlink transmission. In time division duplexing (TDD) mode, as illustrated in FIG. 3, a system frame is 10 ms in length and is composed of two half-frames of 5 ms. Each half-frame includes 5 subframes of 1 ms. In terms of frequency domain, in LTE, the basis unit for frequency domain is one sub carrier.

As mentioned above, there is no concrete scheme for explicit HARQ-ACK which can distinguish DTX from NACK.

One straightforward solution is that gNB feedbacks HARQ-ACK only after the gNB decoding data correctly. But if HARQ-ACK is not received, it is not clear for UE what to do next, this is not conducive to the reliable transmission of data as well as the improvement of data transmission rate.

Taking the above into consideration, here we provide a reliable HARQ-ACK feedback scheme, which can trigger uplink data retransmission based on at least HARQ-ACK/NACK feedback.

According to implementations of the present disclosure, a method for data retransmission is provided, in which data is transmitted to gNB(or any other suitable network device) and a timer is started simultaneously, then the data is retransmitted after the timer expires, upon determining that (i) no HARQ-ACK feedback corresponding to the data is received or (ii) a HARQ-ACK feedback corresponding to the data is received from the gNB before the timer expires.

As can be seen from the above, the uplink data retransmission can be triggered by a timer and a HARQ-ACK feedback, or by a timer and HARQ-ACK/NACK feedback, which will be detailed below separately. The HARQ-ACK feedback is indicative of successful data reception at the gNB. The HARQ-NACK feedback, on the other hand, is indicative of failed data reception at the gNB due to error decoding for example.

I. Retransmission is Triggered by Timer and HARQ-ACK Feedback.

Figure 4:
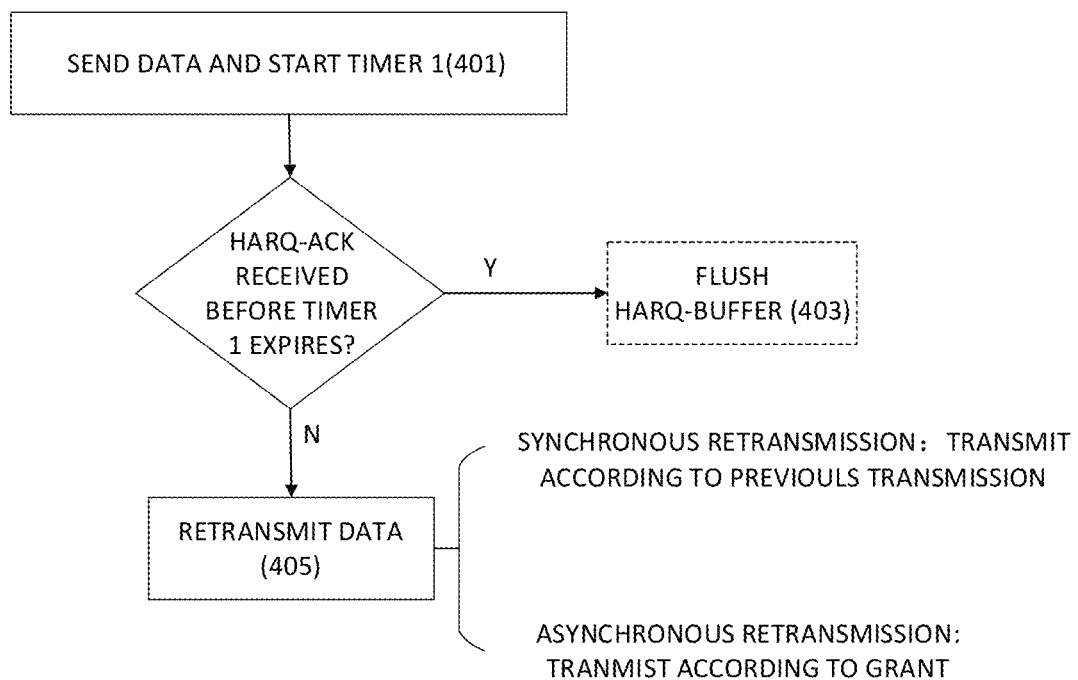
FIG. 4 is a schematic flow chart illustrating a method for controlling data retransmission according to an implementation of the disclosure.

In this case, when UE sends data, Timer 1 starts at the same time (401 of FIG. 4). The duration of Timer 1 can be set according to the number of PDCCH than can be continuously monitored by the UE or according to system requirements, and generally can be set to equal to several subframes in time. For example, if it is desirable for the UE to transmit data quickly for time sensitive events (for example, there is new data such as VoIP data to be transmitted) or for the sake of saving power, the duration of Timer 1 can be set shorter.

The subsequent operation of the UE, including whether retransmitting data or not, depends on whether any HARQ-ACK feedback corresponding to the data is received from the gNB. As illustrated in FIG. 4, if HARQ-ACK feedback is received before or no later than Timer 1 expires, the UE can flush HARQ buffer for example (403 of FIG. 4), otherwise, if no HARQ-ACK feedback is received before or no later than Timer 1 expires, the UE can retransmit the data (405 of FIG. 4), which will be detailed below with reference to FIG. 5 and FIG. 6.

Figure 5:
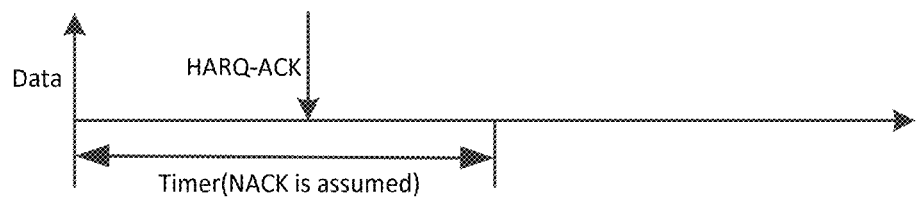
FIG. 5 is a schematic diagram illustrating a situation where a HARQ-ACK feedback is received before a Timer expires.

FIG. 5 is a schematic diagram illustrating a situation where a HARQ-ACK feedback is received before or no later than a Timer expires. As illustrated in FIG. 5, if UE receives HARQ-ACK feedback corresponding to the data before or no later than Timer 1 expires, UE can optionally flush HARQ buffer for the data. Alternatively, UE can choose to do nothing on the HARQ buffer and transmit other data normally.

Figure 6:
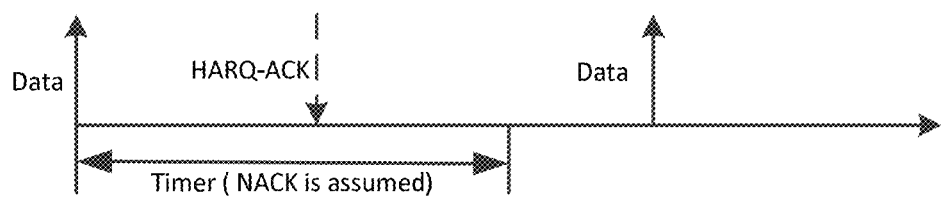
FIG. 6 is a schematic diagram illustrating a situation where no HARQ-ACK feedback is received before a Timer expires.

FIG. 6 is a schematic diagram illustrating a situation where no HARQ-ACK feedback is received before a Timer expires. As illustrated in FIG. 6, if no HARQ-ACK feedback corresponding to the data is received before a Timer expires, the UE assumes that the data is not successfully received, the effect of which is equivalent to receiving a HARQ-NACK feedback. In this case, UE will retransmit the data. Moreover, the UE may choose not to flush HARQ buffer of the data in this case.

In order to guarantee data transmission rate and avoid taking up too much uplink data resources, maximum number of data retransmission can be set beforehand. If the data retransmission number reaches a upper limit, which is defined in specification or configured by higher layer, the UE can flush the HARQ butter and will not retransmit the data any more, no matter whether the HARQ-ACK feedback is received or not. For instance, the maximum number of data retransmission can be set to 3 and if the data has been transmitted for the third time, no matter whether the data is received successfully at the gNB, the data will no longer be retransmitted.

For retransmission schemes, there can be synchronous retransmission and asynchronous retransmission. For synchronous retransmission, retransmission of a HARQ process occurs at a fixed location in time/frequency; for asynchronous retransmission, on the other hand, retransmission can occur at any location which is unknown to the receiver beforehand.

Based on the above, for retransmission scheme used herein, one solution is that UE retransmits data in specific resources. The "specific resource" means defined time and/or frequency resource location and can be deemed as synchronous retransmission. As one implementation, the time resource (such as subframes, slots, and the like) for retransmission can be obtained according to the timer and the frequency resource (such as a resource block or subcarrier of a resource block) for retransmission can be obtained according to frequency resource location for previous transmission, that is, for transmitting the data before current retransmission, then the data can be retransmitted with the time resource and the frequency resource thus obtained.

Figure 7:
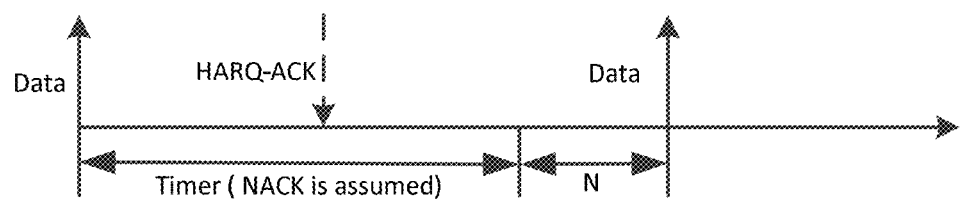
FIG. 7 is a schematic diagram illustrating synchronous HARQ transmission.

FIG. 7 illustrates one example of synchronous HARQ retransmission.

As illustrated in FIG. 7, the location of the time resource for data retransmission is determined by: T+N, where T is the time when the timer expires, and N is a predetermined parameter, which can be configured by higher layer signaling or defined in specification. T can also be set as the duration of the timer. As such, for example, the UE can determine the subframe for retransmitting the data.

The location of the frequency resource is determined by: RB+offset, where RB is the frequency resource location for transmitting the data before current retransmission, and offset is a predetermined parameter, which can be configured by higher layer or defined in specification. As such, the UE can obtain the resource block or even subcarrier of a resource block for data retransmission.

For example, initial transmission or previous transmission (the transmission immediately before the retransmission of the same data) is located in {RB(1), RB(2), RB(3), RB(4)}, then data retransmission can be located at hopping resources such as {RB(1+ offset), RB(2+ offset), RB(3+ offset), RB(4+ offset)}. Alternatively, data retransmission can be located in the same frequency resource {RB(1), RB(2), RB(3), RB(4) }, in this case, the offset=0.

Figure 8:
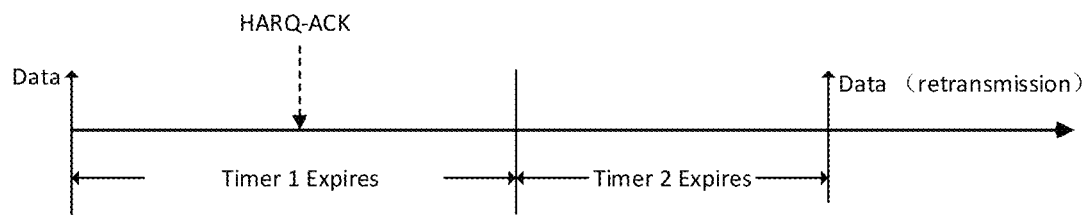
FIG. 8 is a schematic diagram illustrating asynchronous HARQ transmission.

As can be seen, in general, the above solution is synchronous HARQ retransmission. A different asynchronous HARQ transmission is provided below, in which another timer (Timer 2) is provided, as illustrated in FIG. 8.

Figure 9:
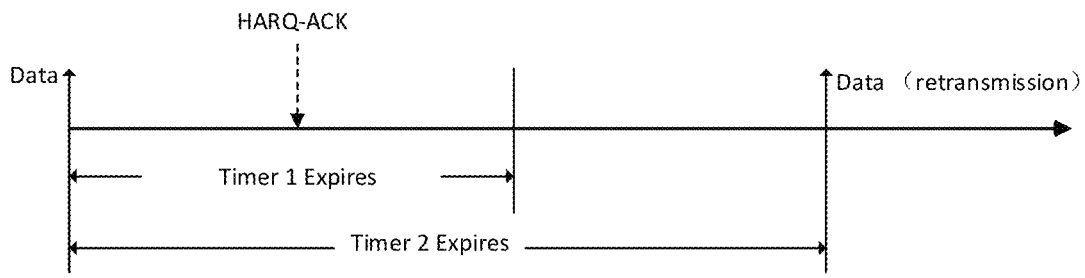
FIG. 9 is another schematic diagram illustrating synchronous HARQ transmission.

Timer 2 is started when Timer 1 expires, and the data is retransmitted according to a grant for retransmission, which is received from the gNB before or no later than Timer 2 expires. That is, UE waits for grant for retransmission till Timer 2 expires. If UE receives grant for retransmission before or no later than Timer 2 expires, UE will retransmit the data according to the grant, otherwise, UE flushes the HARQ buffer. The grant for retransmission received from the gNB may contain information for indicating resources required for data transmission. Still another possibility is that, Timer 1 and Timer 2 can be started at the same time as long as the duration of Timer 2 is longer than that of Timer 1, as illustrated in FIG. 9. As can be seen from FIG. 9, Timer 2 has duration longer than Timer 1, thus Timer 2 is still in process when Timer 1 expires, and if a grant for retransmission is received from gNB before or no later than Timer 2 expires, UE can retransmit the data according to the grant.

In the foregoing solutions, data retransmission is triggered by timer and HARQ-ACK feedback, which provides high reliability by two-step feedback mechanism. When timer expires and no HARQ-ACK is received, HACK-NACK is assumed to have occurred to avoid NACK-TO-ACK error. Since HARQ-ACK is one bit information, such HARQ-ACK only feedback scheme reduces physical channel overhead.

II. Retransmission is Trigged by Timer and HARQ-ACC/NACK Feedback

Figure 10:
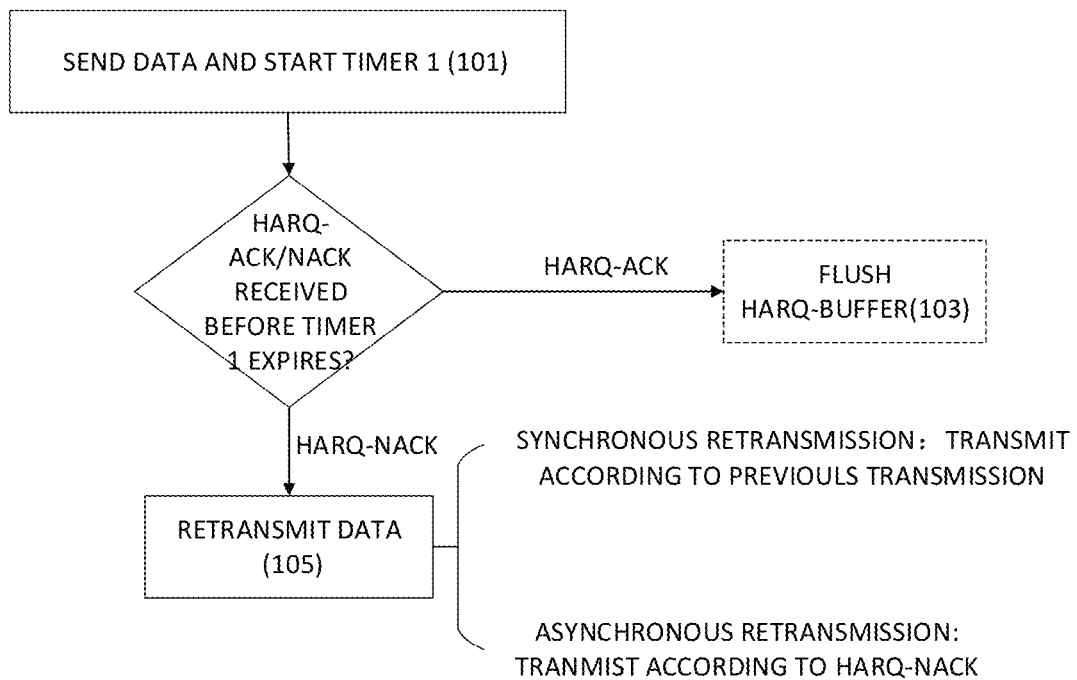
FIG. 10 is another schematic flow chart illustrating a method for controlling data retransmission according to an implementation of the disclosure

In this solution, as illustrated in FIG. 10, UE sends data to gNB and meanwhile Timer 1 starts (101 of FIG. 10), but different from FIG. 4, the UE will only retransmit the data when HARR-NACK feedback is received before or no later than Timer 1 expires, as detailed below.

Similar to solution I, if UE receives HARQ-ACK feedback corresponding to the data before Timer 1 expires, UE will flushes the HARQ buffer and will not retransmit the data, as illustrated in 103 of FIG. 10.

Figure 11:
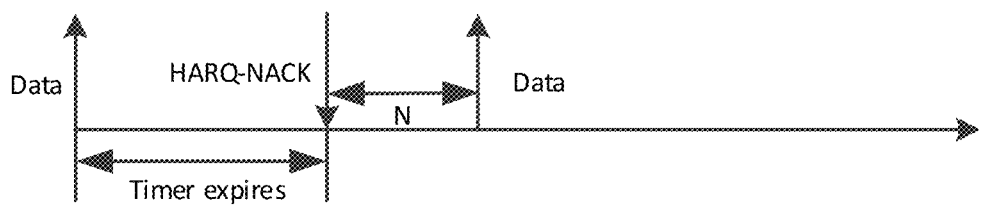
FIG. 11 is a schematic diagram illustrating a situation where a HARQ-NACK feedback is received before a Timer expires.
Figure 12:
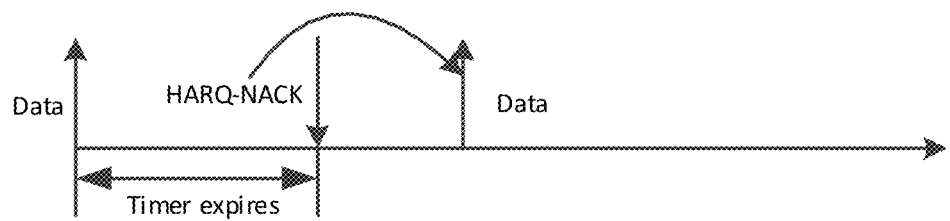
FIG. 12 is another schematic diagram illustrating a situation where a HARQ-NACK feedback is received before a Timer expires.

If UE receives HARQ-NACK feedback corresponding to the data before the timer expires, then UE retransmits the data at 105 of FIG. 10, the details of which are illustrated in FIG. 11 and FIG. 12 respectively. The timer can be terminated upon reception of the HARQ-NACK feedback corresponding to the data. The data can be retransmitted according to the retransmission schemes illustrated in FIG. 11 and FIG. 12. The difference in FIG. 11 and FIG. 12 lies in the retransmission scheme adopted at the UE. Typically, FIG. 11 illustrates synchronous HARQ retransmission similar as FIG. 7, where the retransmission resource is obtained according to the timer and resources for transmitting data before the retransmission, and FIG. 12 illustrates asynchronous HARQ transmission.

For asynchronous HARQ transmission, information for indicating retransmission resources is included in the HARQ-NACK feedback, and UE can retransmit data according to the information included in the HARQ-NACK feedback.

With aid of the above solution, data retransmission is triggered by timer and HARQ-ACK/NACK feedback, which provides high reliability by two-step feedback mechanism and when an explicit HARQ-NACK feedback corresponding to the data is received before or no later than timer expires, data will be retransmitted, so as to avoid NACK-to-ACK error. Such HARQ-NACK/ACK feedback can trigger retransmission as soon as possible by early HARQ-NACK.

Implementations of the disclosure further provide a user equipment (UE), which can be configured to perform the foregoing methods for controlling data retransmission. The UE can be structured as that illustrated in FIG. 13, which is a block diagram illustrating the UE according to an implementation of the present disclosure.

Figure 13:
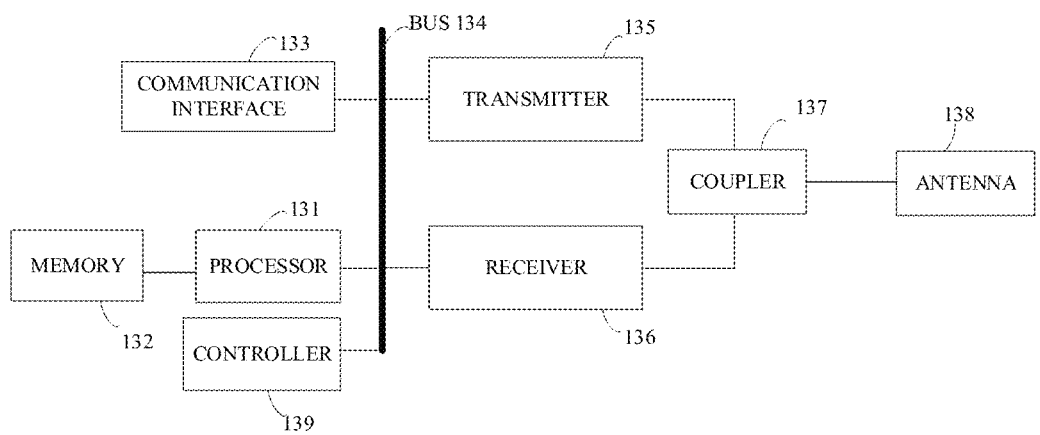
FIG. 13 is a block diagram illustrating user equipment according to an implementation of the disclosure.

As illustrated in FIG. 13, UE 130 includes one or more processors 131, a memory 132, a communication interface 133, a transmitter 135, a receiver 136, and a controller 139. These components may be connected via a bus 134 or other means. As illustrated in FIG. 13, the network device 130 may further include a coupler 137 and an antenna 138 connected to the coupler 137.

Communication interface 133 can be a LTE (4G) communication interface, a 5G communication interface, or a future new air interface. Communication interface 133 may be used for network device 130 to communicate with other communication devices, such as gNB or other network devices at the network side. The network device 130 may also be equipped with a wired interface for wired communication.

Transmitter 135 may be used to transmit signals or data in PUCCH. Receiver 136 can be used for receiving and/or processing of signals or data received via antenna 138, for example, receiver 136 can be configured to receive HARQ- ACK/NACK from the gNB. In some implementations, the transmitter 135 and the receiver 136 can be considered as a wireless modem. In the UE 130, more than one transmitter 135 can be provided. Similarly, more than one receiver 136 can be provided.

Processor 131 can be responsible for wireless channel management, communication link establishment, and cell switching control. Processor 131 can also read and execute computer readable instructions such as those stored in memory 132 which is coupled thereto.

Memory 132 is configured to store various software programs and/or instructions, operating systems, and network communication programs or protocols. Memory 132 may include high speed random access memory (RAM), and can also include non-transitory memory, such as one or more disk storage devices, flash memory devices, or other non-volatile solid-state storage devices. The memory 132 can also have a storage area for HARQ-buffer. Alternatively, the HARQ-buffer can be set separately somewhere else.

The controller 139 can set timers and monitor whether the timer expires or not.

Based on the above structure, UE 130 can obtain data from the memory 132 and transmit the data obtained to gNB through transmitter 135, and at the same time, the controller 139 starts Timer 1 for example.

In one implementation, the processor 131 determines whether any HARQ-ACK feedback corresponding to the data is received through the receiver 136 before or no later than the Timer 1 expires, if yes, the processor 131 can flush the HARQ-buffer or do nothing except waiting to transmit another data. Otherwise, the UE 130 will retransmit the data through the transmitter 135 according to a specific retransmission scheme. The retransmission scheme can be a synchronous retransmission or asynchronous retransmission. In case of synchronous retransmission, the UE 130 can obtain the retransmission resource according to previous transmission, in other words, according to the resource for transmitting data before the retransmission; and in case of asynchronous retransmission, the UE can obtain retransmission resource according to an instruction or grant for retransmission received from the gNB. Such resource determination can be done by the processor 131 for example.

In another implementation, the UE 130 determines whether any HARQ-ACK feedback or HARQ-NACK feedback corresponding to the data is received through the receiver 136 before or no later than Timer 1 expires. If HARQ-NACK feedback corresponding to the data is received before Timer 1 expires, the UE 130 will retransmit the data according to information for indicating data retransmission included in the HARQ-NACK feedback. If HARQ-ACK feedback corresponding to the data is received through the receiver 136 before or no later than the Timer 1 expires, same as discussed before, the processor 131 can flush the HARQ-buffer and no data retransmission occurs.

Figure 14:
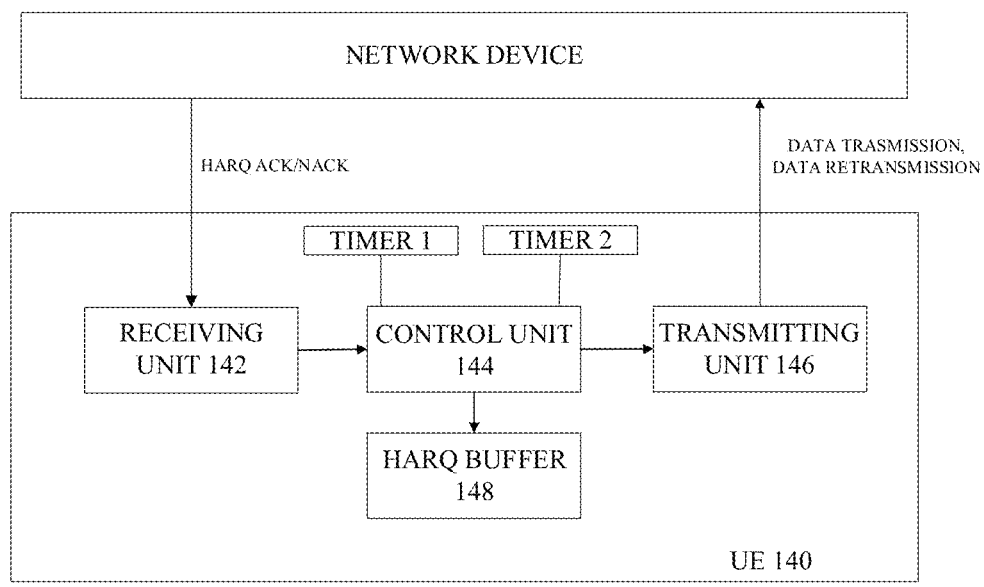
FIG. 14 is a block diagram illustrating user equipment according to another implementation of the disclosure

UE according to another implementation is further provided. FIG. 14 is a block diagram illustrating the UE. As illustrated in FIG. 14, UE 140 includes a receiving unit 142, a control unit 144, a transmitting unit 146, and a HAQR buffer 148. The control unit 144 is configured to control setting of at least one timer. According to actual needs or design, one or two or even more than two timers can be set. For example, the control unit 144 is configured to control starting of Timer 1, Timer 2, and the like. The control unit 144 can be coupled with the receiving unit 142, the transmitting unit 146, and the HAQR buffer 148. The transmitting unit 146 is configured to transmit or retransmit data to a network device, and the receiving unit 142 is configured to receive feedback from the network device. The feedback referred to in this context can include HARQ ACK, HARQ NACK.

The transmitting unit 146 can be implemented as the transmitter 135 of FIG. 13. The receiving unit 142 can be implemented as the receiver 136 of FIG. 13. The control unit 144 can be implemented as the controller 139 of FIG. 13. Still possibly, the transmitting unit 146, the receiving unit 142, and/or the control unit 144 can be integrated into a processor, such as the processor 131 of FIG. 13.

When conduct data transmission at the UE 140, the transmitting unit 146 transmits data to the network device, and at the same time, the control unit 144 starts Timer 1 for example.

After data transmission, the control unit 144 monitors to see if any HARQ-ACK feedback corresponding to the data is received by the receiving unit 142 before or no later than the Timer 1 expires, if yes, the control unit 144 can flush the HARQ-buffer or do nothing but waiting the transmitting unit 146 to transmit another data. Otherwise, if no HARQ-ACK feedback corresponding to the data is received by the receiving unit 142 before or no later than the Timer 1 expires, the transmitting unit 146 will retransmit the data according to a specific retransmission scheme. The retransmission scheme can be a synchronous retransmission or asynchronous retransmission. In case of synchronous retransmission, the transmitting unit 146 can obtain the retransmission resource according to Timer 1 and/or resources for transmitting data before retransmission; and in case of asynchronous retransmission, the transmitting unit 146 can obtain retransmission resource according to an instruction or grant for retransmission received from the gNB.

As another implementation, after data transmission, the control unit 144 monitors to see if HARQ-ACK feedback or HARQ-NACK feedback corresponding to the data is received by the receiving unit 142 before or no later than Timer 1 expires. If HARQ-ACK feedback corresponding to the data is received by the receiving unit 142 before Timer 1 expires, the control unit 144 can flush the HARQ-buffer, here, no data retransmission occurs. If HARQ-NACK feedback corresponding to the data is received by the receiving unit 142 before Timer 1 expires, the transmitting unit 146 will retransmit the data according to a synchronous retransmission or asynchronous retransmission, as mentioned before.

One of ordinary skill in the art can understand that all or part of the process for implementing the above implementations can be completed by a computer program to instruct related hardware, and the program can be stored in a non-transitory computer readable storage medium. In this regard, according to implementations of the disclosure, a non-transitory computer readable storage medium is provided. The non-transitory computer readable storage medium is configured to store at least one computer readable program which, when executed by a computer, cause the computer to carry out all or part of the operations of the method for controlling data retransmission of the disclosure. Examples of the non-transitory computer readable storage medium include but are not limited to read only memory (ROM), random storage memory (RAM), disk or optical disk, and the like.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A method for controlling data retransmission, comprising:
   transmitting data to a network device and starting a timer; and
   retransmitting the data after the timer expires, if a HARQ-ACK feedback corresponding to the data is not received before the timer expires;
   retransmitting the data if a HARQ-NACK feedback corresponding to the data is received from the network device before the timer expires; wherein retransmitting the data comprising:
   obtaining a time resource for retransmission according to the timer;
   obtaining a frequency resource for retransmission according to previous transmission; and
   retransmitting the data with the time resource and the frequency resource; wherein a location of the time resource is determined by: T+N, wherein T is the time when the timer expires, and N is a predetermined parameter; wherein a location of the frequency resource is determined by: RB +offset, wherein RB is a location of a frequency resource for transmitting the data before the retransmission, and offset is a predetermined parameter.

2. The method of claim 1, further comprising:
   flushing a HARQ buffer if the HARQ-ACK feedback corresponding to the data is received from the network device before the timer expires.

3. The method of claim 1, wherein offset=0.

4. The method of claim 1, wherein the HARQ-NACK feedback contains information for indicating retransmission resource, and retransmitting the data comprises:
   retransmitting the data at the retransmission resource indicated by the information.

5. The method of claim 1, further comprising:
   flushing a HARQ buffer if the number of data retransmission reaches a threshold, wherein the threshold is defined in specification or configured by higher layer.

6. A user equipment, comprising: a processor, a transmitter, and a receiver, wherein
   the processor is configured to control starting of a timer;
   the receiver is configured to receive a HARQ-ACK feedback or a HARQ-NACK feedback from a network device; and
   the transmitter is configured to:
   transmit data to the network device; and
   retransmit the data if a HARQ-ACK feedback corresponding to the data is not received by the receiver before the timer expires;
   retransmit the data if a HARQ-NACK feedback corresponding to the data is received by the receiver from the network device before the timer expires; wherein the transmitter is configured to:
   obtain a time resource for retransmission according to the timer;
   obtain a frequency resource for retransmission according to previous transmission; and
   retransmit the data with the time resource and the frequency resource; wherein a location of the time resource is determined by: T+N, wherein T is the time when the timer expires, and N is a predetermined parameter; wherein a location of the frequency resource is determined by: RB+offset, wherein RB is a location of a frequency resource for transmitting the data before the retransmission, and offset is a predetermined parameter.

7. The user equipment of claim 6, wherein the processor is further configured to:
   flush a HARQ buffer if the receiver receives the HARQ-ACK feedback corresponding to the data from the network device before the timer expires.

8. The user equipment of claim 6, wherein offset=0.

9. The user equipment of claim 6, wherein the HARQ-NACK feedback contains information for indicating retransmission resource, and the transmitter is configured to:
   retransmit the data at the retransmission resource indicated by the information.

10. The user equipment of claim 6, wherein
    the processor is further configured to flush a HARQ buffer if the number of data retransmission reaches a threshold,
    wherein the threshold is defined in specification or configured by higher layer.

* * * * *